May 5, 1964     J. TALENTINOW ETAL     3,132,288
COMBINED ELECTRICAL CONNECTOR AND SUPPORT MEANS
FOR HOLLOW ELECTRICAL COMPONENTS
Filed April 24, 1961
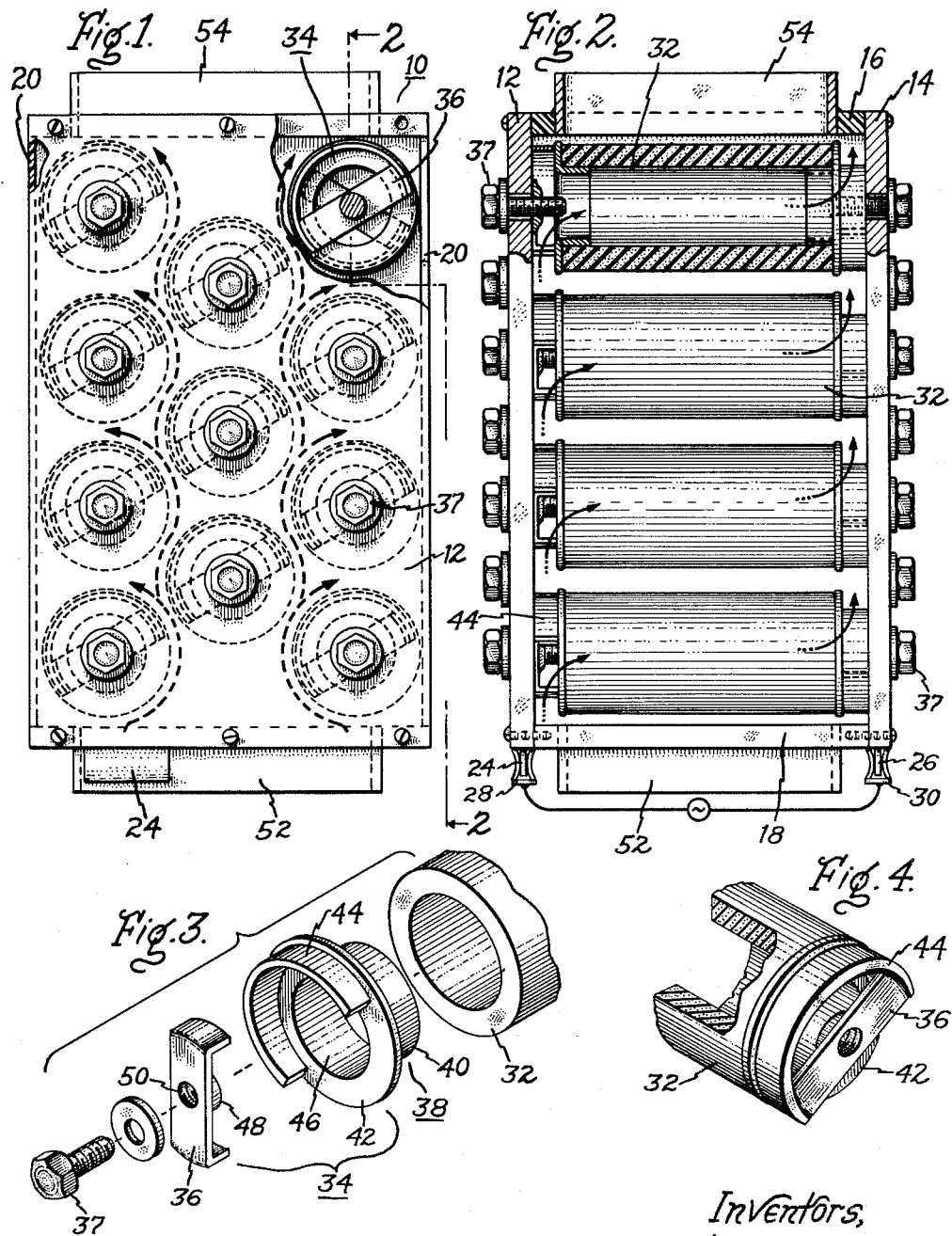
Inventors,
Francis B. Headley,
John Talentinow,
by Francis K. Doyle
Their Attorney.

United States Patent Office 3,132,288
Patented May 5, 1964

3,132,288
COMBINED ELECTRICAL CONNECTOR AND SUPPORT MEANS FOR HOLLOW ELECTRICAL COMPONENTS
John Talentinow, Granby, and Francis B. Headley, Agawam, Mass., assignors to General Electric Company, a corporation of New York
Filed Apr. 24, 1961, Ser. No. 105,124
5 Claims. (Cl. 317—100)

This invention relates to a combined connector and support means for electrical components and more particularly to an improved combined electrical connector and support means for hollow electrical components.

In various types of electrical apparatus, many electrical components are utilized to provide the desired operation of the electrical apparatus and to enable various electrical values to be obtained from such electrical apparatus. In these various types of apparatus, the electrical components, which are utilized, are often subjected to extremely high values of electrical energy. The components thus tend to generate a great amount of heat. Were this heat allowed to accumulate within the component, the life of the component would be greatly shortened and the electrical apparatus would be subject to failure due to the deterioration of such electrical component. It is, therefore, a well known expedient in such electrical apparatus to provide for a cooling fluid flow through such apparatus to dissipate the heat of the various electrical components. Examples of such coolant fluid would be a cooling oil or cooling gas, which flows over such electrical components and carries away much of the heat which is generated therein.

In many of these apparatuses, various hollow electrical components are utilized. When using such hollow components, it is desired that the flow of coolant be carried through the hollow interior of the component as well as over its exterior surface. This enables the component to be operated at higher values of electrical energy without accumulating large quantities of heat, which would rapidly deteriorate such components. However, as is well known to those skilled in the electrical art, in most electrical apparatus space is at a great premium and, therefore, it is desired that the various electrical components be mounted in as compact a space as is possible. When utilizing hollow electrical components, it has not been previously possible to mount these components substantially flush to walls or other barriers inasmuch as the flush-mounting would substantially hinder the flow of coolant through the interior of such hollow electrical components. Further, it has been found necessary to provide for electrical leads coming from such components to the various terminals where the electrical energy is provided to the electrical components. From the above, it can be seen that there is a need for a combined electrical connector and support means, particularly for use with hollow electrical components, whereby such components can be mounted substantially flush with a wall or other barrier means to provide the desired electrical connection directly to the electrical component without the use of leads, and, also, to provide at the same time for the flow of coolant through the interior of such hollow electrical component.

It is therefore, one object of this invention to provide a combined electrical connector and support means which will enable the substantial flush-mounting of hollow electrical components while at the same time providing for the flow of coolant to the interior of such components.

It is a further object of this invention to provide a combined electrical connector and support means which will substantially eliminate the need for electrical leads to such components.

It is a further object of this invention to provide a combined electrical connector and support means which will enable the substantial flush mounting of such electrical components while at the same time directing coolant fluid to the interior portion of such hollow electrical components.

In carrying out this invention in one form, a combined electrical connector and support means is provided for hollow electrical components. The support and connector means comprises a hollow annular portion which is insertable into, or otherwise connectable to the end of the hollow component, and is provided with a flanged member to make electrical contact with the end of such component. A partial rim is provided about the flange and at right angles thereto so as to direct coolant flow into or out of the hollow annular portion of such connector and support means. Mounting means are provided, fitting within the rim of such electrical connector and support means to provide electrical contact to the electrical connector and support means from the wall or barrier on which such electrical component is mounted.

The invention which is sought to be protected will be particularly pointed out in the claims which are appended to this specification. However, it is believed that this invention and the manner in which the various objects hereinbefore set forth are obtained, as well as other objects and advantages thereof, will be more readily understood from the following description, when taken in connection with the accompanying drawing, in which:

FIGURE 1 is an end view of an electrical device showing an array of hollow electrical components being mounted within such device by one form of the combined electrical connector and support means of this invention;

FIGURE 2 is a side view taken on the lines 2—2 of FIGURE 1, with one wall of the electrical device removed to more clearly illustrate the invention;

FIGURE 3 is an exploded perspective view of one form of the electrical connector and support means of this invention; and FIGURE 4 is a perspective view of the support means and electrical connector shown in FIGURE 1, showing the means attached to one end of a hollow electrical component.

Referring now to the drawings, in which like numerals are used to indicate like parts throughout, this invention, in one form, is shown as being used to mount an array of electrical components in a plug-in type of electrical device in the form of a box. The components are mounted substantially flush with the conductive sides of the electrical box and a flow of coolant fluid is provided to the electrical box by means of openings in the top and bottom of such electrical box. Referring now particularly to FIGURE 1 and FIGURE 2 of the drawing, a plug-in type of electrical box 10 is shown which comprises the conductive sidewalls 12 and 14 and is provided with insulating end walls 16 and 18 and other insulating sidewalls 20 and 22. In order to provide electrical energy to the sidewalls 12 and 14 of the electrical box 10, plug-in members 24 and 26 are provided, which are adapted to plug into energized plug devices such as 28 and 30. Plugs 28 and 30 may be energized, as indicated, by any appropriate source of current. Of course, it will be understood that the conductive sidewalls 12 and 14 may be solid conductors for the parallel connection of the hollow electrical components, generally indicated as 32. Alternatively, the sidewalls 12 and 14 may be of insulating material to which conducting strips are fastened. As will be readily apparent to those skilled in the art, the conducting strips may be fastened so as to permit series connection of the components 32, or any desired combination of series and parallel connections of the components 32.

Mounted within the electrical box 10 are a number of hollow electrical components, generally indicated as 32, which may be, for example, an array of resistors. Each of the hollow electrical components is mounted substantially flush with the electrical conductive sidewalls 12 and 14 by means of the combined electrical connector and support means of this invention, generally indicated as 34 (see FIGURE 3). The combined electrical connector and support means 34 may be secured to the component 32 in any desired manner, for example, by means of a press fit between the connector 34 and the component 32. A conductive paste could also be used, if desired. As shown, the electrical connector and support means 34 may include a strap member 36 which is securely fastened to the conductive side 12 by any desired fastening means, such as, for example, bolt means 37. In this manner, the electrical component 32 is mounted substantially flush to the wall 12 and electrical contact is made from said electrical conductive wall 12 to the electrical component 32 by means of the combined electrical connector and support means 34 of this invention.

The electrical connector and support means of this invention, in one form, is more clearly shown in FIGURES 3 and 4, to which reference will now be made. FIGURE 3 shows a preferred embodiment of the combined electrical connector and support means 34 in an exploded view. The electrical connector comprises the strap member 36 and the mounting ferrule and connector 38. The mounting ferrule and connector 38, in the preferred form, is comprised of an annular portion 40, which is shaped to fit snugly within the hollow core of the electrical component 32 to securely fasten the connector 34, thereto. Formed with the annular portion 40 is an annular flange member 42 which butts against the end of the hollow electrical component 32 and makes electrical contact therewith. Supported on the annular flange 42 is a partial rim member 44 which extends at right angles to the flange member 42. As can be seen, by means of the partial rim member 44, the flow of coolant will be directed into the hollow central portion 46 of the electrical connector and support member 38 and, therefore, into the hollow core of the electrical component 32.

In order to mount the electrical connector and support means 34 on the side of a duct or other wall, the strap member 36 is provided and fits within the edge of the rim 44 and against the flange member 42. A boss means 48 is provided on the strap member 36 having a tapped hole 50 therein for the reception of the bolt means 37. In this manner, the hollow electrical component 32 may be securely mounted to a bus bar or sidewall, such as 12. A firm electrical contact is made between the energized wall member 12 and the electrical component 32 through the electrical connector and support means 34.

Referring now to FIGURE 2 of the drawing, it will be seen that the various electrical components 32 are each mounted on the electrical conductive walls 12 and 14 by means of the electrical connector and support 34 of this invention. Coolant flow is provided into the electrical box 10 by means of the intake duct 52 in the bottom wall 18 of the box. The coolant is caused to flow out of the box through the duct member 54 which is mounted in the top wall 16 of the electrical box. As indicated, the duct members 52 and 54 preferably extend over substantially the entire cross-sectional area of the device 10 to provide substantially uniform flow characteristics. As the coolant flows into the box member 10, it flows over the exterior of the array of hollow electrical components, in the manner shown by arrows in FIGURE 1 of the invention. Further, the coolant is caused to flow into the hollow interior core of the various electrical components by means of the novel electrical connector and support member of this invention. As indicated by the arrows in FIGURE 2, the coolant is caused to flow through the hollow center of component 32 by the lower support member 34 supporting electrical component 32 on the left side and, flows outwardly and upwardly from the right side. This directed coolant flow is provided by means of the rim member 44 which, as can be seen by FIGURE 2, is open on the lower portion at the left side of the electrical component 32, and is open at the top portion on the right side of such electrical component. Therefore, as the coolant flows through the duct member 52, it is caused to flow into the hollow electrical component 32 through the opening in rim member 44, then through the hollow center of the component 32 and out through the opening of the rim 44 on the upper side of such electrical component. Of course, the coolant fluid will be caused to flow through the hollow core of all of the hollow electrical components which are mounted in this array, due to the electrical connector and support member of this invention. Thus it can be seen that the various objects and advantages of this invention which were set forth in the opening paragraphs have been fully realized by the electrical connector and support means of this invention.

Of course, it will be understood that while the invention has been disclosed as being utilized with an electrical box having conductive side walls and being closed on the other sides thereof, that the invention may readily be used in any electrical apparatus where it is desired to mount a single electrical component or an array of electrical components in the manner set forth. For example, the side walls 12 and 14 could be bus bars and the various electrical components 32 would be mounted along such bus bars by use of the electrical connector and support means of this invention to provide a mounting and connecting means and to allow the coolant to flow through the interior of such hollow electrical components to dissipate the heat generated therein.

While there has been shown and described the preferred embodiment of this invention, it will be well understood by those skilled in the art, that various changes may be made in the shape or size of the combined electrical connector and support means of this invention if desired. For example, the strap member 36 could, if desired, be made as a part of the rim member 44 rather than as a separate member. Further, it will be apparent to those skilled in this art, that the combined electrical connector and support means of this invention could be secured to the hollow electrical component by means of an external annular member, rather than the internal annular member described. Therefore, it will be understood that the preceding description is for purpose of illustration only, and the invention is not to be considered as limited thereby, but rather, it is intended to cover all such modifications as fall within the true spirit and scope of this invention, as defined in the appended claims.

What is claimed as new and which it is desired to be secured by Letters Patent of the United States is:

1. A combined electrical connector and support means for hollow electrical components comprising; a hollow annular portion adapted to be secured to the hollow end of a hollow electrical component, a flange member on said hollow annular portion adapted to make electrical contact with the end of a hollow electrical component, a partial rim member formed about said flange and at right angle thereto, and a strap member secured to said partial rim member and having a mounting means thereon, whereby said hollow electrical connector and support means may be mounted against a wall portion.

2. A combined electrical connector and support means for mounting a hollow electrical component and providing coolant flow into the interior thereof comprising; a hollow annular portion adapted to be secured to the hollow electrical component, said annular portion being provided with a flanged member to make electrical contact with the end of such component, a partial rim member formed about said flange member and at right angles thereto for directing coolant flow into the hollow annular portion, and a mounting means for mounting said combined electrical connector and support means.

3. A combined electrical connector and support means for hollow electrical components comprising; a flange member adapted to make electrical contact with the end of a hollow electrical component, said flange member being provided with a central opening therethrough adapted to provide communication with the interior of a hollow electrical component, means for securing said flange member to a hollow electrical component, a partial rim member formed about said flange member and at right angles thereto, and a mounting means for mounting said electrical connector and support means to a conductive member.

4. A combined electrical connector and support member for mounting a hollow electrical component and providing coolant flow therethrough comprising; an annular portion adapted to be secured to the interior of the hollow electrical component, a flange member integral with said annular portion and adapted to make electrical contact with the end of such component, said annular portion and said flange member provided with a central opening therethrough adapted to provide communication with the interior of the hollow electrical component, a partial rim member formed integral with said flange member and at right angles thereto for directing coolant flow into and out of the hollow electrical component, and a mounting means for mounting said electrical connector and support means to a conductive member.

5. A combined electrical connector and support means as claimed in claim 4 wherein said mounting means are in the form of a strap member which fits securely within said partial rim member.

References Cited in the file of this patent

UNITED STATES PATENTS

| | | |
|---|---|---|
| 2,128,086 | Gakle | Aug. 23, 1938 |
| 2,498,233 | Baker | Feb. 21, 1950 |